United States Patent
Cain et al.

(10) Patent No.: US 7,808,140 B2
(45) Date of Patent: Oct. 5, 2010

(54) ESP MOTOR DESIGN

(75) Inventors: Sean A. Cain, Owasso, OK (US); Jim F. Evenson, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/186,652

(22) Filed: Aug. 6, 2008

(65) Prior Publication Data

US 2009/0039722 A1 Feb. 12, 2009

Related U.S. Application Data

(60) Provisional application No. 60/954,523, filed on Aug. 7, 2007.

(51) Int. Cl.
*H02K 5/16* (2006.01)

(52) U.S. Cl. .......................................... 310/90

(58) Field of Classification Search .................. 310/90
See application file for complete search history.

(56) References Cited

U.S. PATENT DOCUMENTS

| 4,435,661 | A | * | 3/1984 | Witten ........................... 310/90 |
| 4,513,215 | A | * | 4/1985 | Del Serra ....................... 310/90 |
| 4,833,041 | A | | 5/1989 | McComas |
| 5,795,075 | A | | 8/1998 | Watson |
| 5,839,880 | A | * | 11/1998 | Okada et al. ................. 415/229 |
| 6,183,546 | B1 | * | 2/2001 | McComas ................... 106/1.22 |
| 6,836,388 | B2 | | 12/2004 | Nishimura et al. |
| 6,956,310 | B1 | * | 10/2005 | Knox ............................ 310/90 |

FOREIGN PATENT DOCUMENTS

| JP | 05-019636 | 3/1993 |
| JP | 05-052222 | 3/1993 |
| JP | 08-338425 | 12/1996 |

* cited by examiner

*Primary Examiner*—Quyen Leung
*Assistant Examiner*—Leda Pham
(74) *Attorney, Agent, or Firm*—Bracewell & Giuliani LLP

(57) ABSTRACT

A submersible pump motor having an electroless nickel-boron coating applied to the sleeve and/or bearing.

18 Claims, 2 Drawing Sheets

ESP MOTOR DESIGN

CROSS-REFERENCE TO RELATED APPLICATIONS

The present application claims priority to and the benefit of U.S. Provisional Patent Application No. 60/954,523, filed on Aug. 7, 2007, the disclosure of which is incorporated herein by reference.

BACKGROUND

Field of Invention

This invention relates in general to submersible pump motors, and in particular to a hardened sleeve and/or bearing coated with a nickel-boron layer which decreases wear and improves running life.

SUMMARY OF INVENTION

In view of the foregoing, embodiments of the present invention beneficially provide a new and improved electrical submersible pump motor and related methods which utilize an electroless nickel-boron coating applied to the sleeve and/or bearing in order to reduce motor wear. The sleeve and/or bearing is made from a typically low cost substrate material and coated with a layer of a nickel boron electroless deposition coating. The surface of sleeve and/or bearing can be processed after coating using a process, such as grinding, so that the finished dimensions will provide the desired clearances for the pump motor. The sleeves and/or bearings can be constructed to be interchangeable with existing standard non-coated bearings and sleeves. Accordingly, the embodiments of the present invention provide a hardened surface which decreases wear and improves running life of a submersible motor.

BRIEF DESCRIPTION OF DRAWINGS

Some of the features and benefits of the present invention having been stated, others will become apparent as the description proceeds when taken in conjunction with the accompanying drawings, in which.

DETAILED DESCRIPTION OF THE EXEMPLARY EMBODIMENTS

The present invention will now be described more fully hereinafter with reference to the accompanying drawings in which exemplary embodiments of the invention are shown. This invention may, however, be embodied in many different forms and should not be construed as limited to the illustrated embodiments set forth herein; rather, these embodiments are provided so that this disclosure will be through and complete, and will fully convey the scope of the invention to those skilled in the art. Like numbers refer to like elements throughout.

Figure 1:
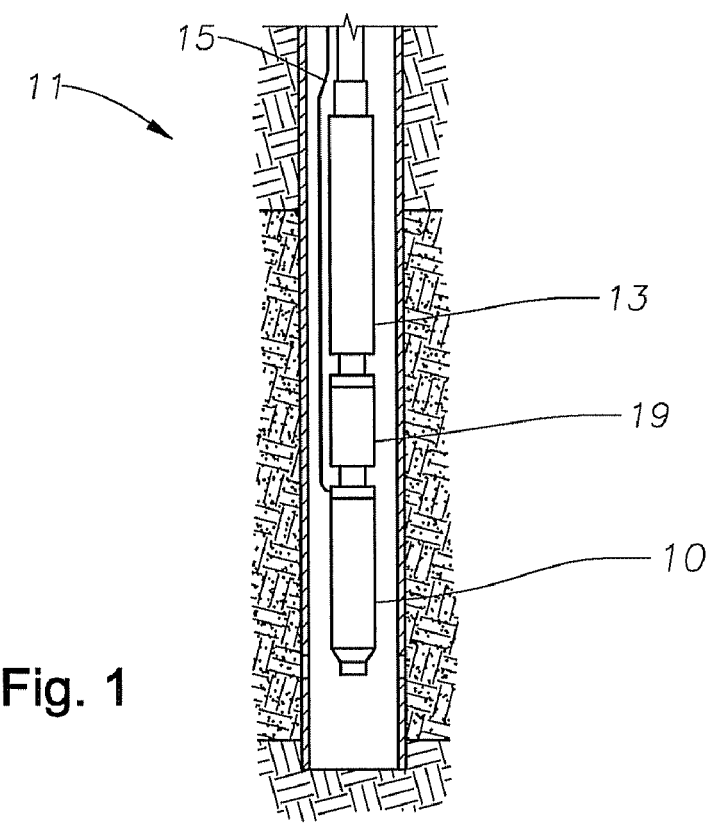
FIG. 1 is a perspective view of an exemplary embodiment of an electrical submersible pump assembly.

The exemplary embodiments of the downhole assembly of the present invention are used in oil and gas wells for producing large volumes of well fluid. As illustrated in FIG. 1, downhole assembly 11 has a electrical submersible pump 13 ("ESP") with a large number of stages of impellers and diffusers. The pump is driven by a downhole motor 10, which is a large three-phase AC motor. Motor 10 receives power from a power source (not shown) via power cable 15. Motor 10 is filled with a dielectric lubricant. A seal section 19 separates motor 10 from ESP 13 for equalizing internal pressure of lubricant within the motor to that of the well bore. Additional components may be included, such as a gas separator, a sand separator and a pressure and temperature measuring module. Large ESP assemblies may exceed 100 feet in length.

Figure 2:
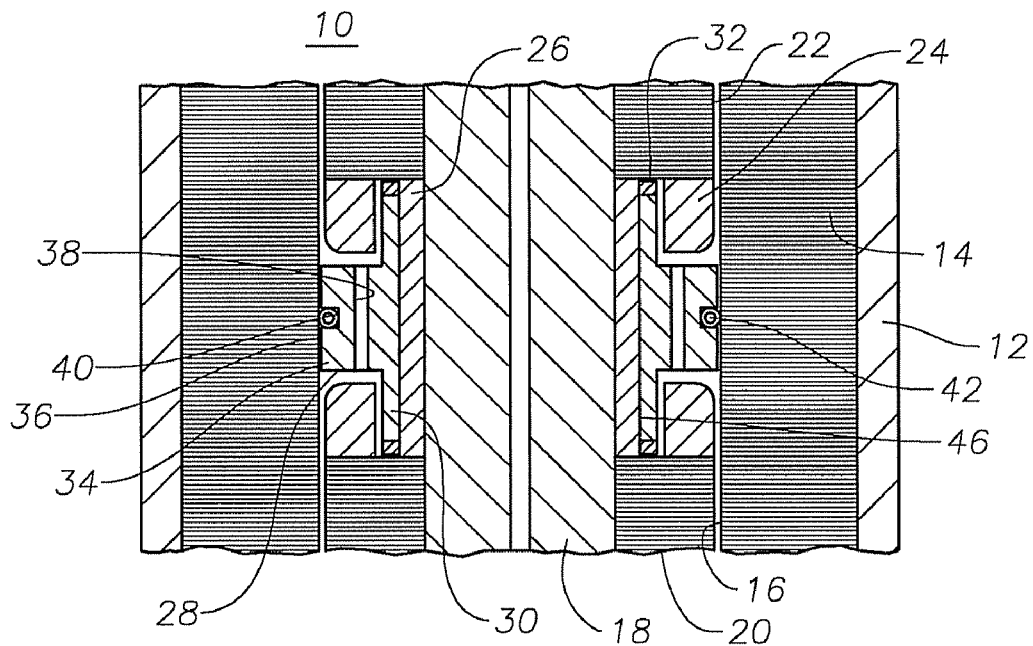
FIG. 2 is a partial, sectional view of an electrical submersible motor according to an exemplary embodiment of the present invention.

Referring to FIG. 2, an exemplary embodiment of the present invention, motor 10 includes a cylindrical housing 12. A stator 14 is rigidly mounted within cylindrical housing 12. Stator 14 is composed of a large number of flat magnetic disks, called laminations, having slots through which wires (not shown) are wound in a conventional manner. All the disks of stator 14 are composed of magnetic steel and may be insulated from each other by coatings in a conventional manner. Stator 14 has a cylindrical inner wall 16 that is of a uniform constant diameter.

Further referring to the exemplary embodiment of FIG. 2, a rotor assembly is rotatably mounted within the cylindrical inner wall 16 of stator 14. The rotor assembly is comprised of a shaft 18 and a large number of metallic disks or laminations. The laminations are divided into identical rotor sections 20. In the most preferred embodiment, rotor sections 20 are fifteen inches in length.

A portion of two rotor sections 20 are shown in FIG. 2. Each rotor section 20 has an outer wall 22 that is closely spaced to the cylindrical inner wall 16 of stator 14. Each rotor section 20 is secured by copper rods (not shown), with copper end rings 24 on both sides. The ends of the copper rods are brazed or mechanically bonded to the end rings 24 to hold the laminations in each rotor section 20 together.

Further referring to the exemplary embodiment of FIG. 2, each rotor section 20 may be secured by a key (not shown) to the shaft 18 for rotation therewith. Alternatively, or in addition thereto, a retaining ring may be attached at the top and bottom of the shaft 18 to prevent movement of the rotor sections 20 beyond the ends of the shaft. The sections of the rotor 20 are not individually axially locked to the shaft 18. However, the lowermost section of rotor 20 at the end of the shaft 18 is axially locked to support the sections of the rotor 20 with respect to the shaft 18. Also, the uppermost section of the rotor 20 will be axially locked to the shaft.

A bearing assembly is located between each of the rotor sections 20. The bearing assembly includes a bushing or sleeve 26 that is secured to shaft 18 for rotation therewith by means of a key (not shown) and an outer bearing body 28 or carrier bearing. In the most preferred embodiment, the material used for the bearings would be a Nitralloy or Stellite. Other alternatives include, but are not limited to, 300 Series and 400 Series stainless steels, many different grades of aluminum, nickel alloys or other grates to tool steels. Sleeve 26 is cylindrical and preferably made of a hardened substrate material, such as, for example, bronze and is axially locked to shaft 18. In the most preferred embodiment, sleeve 26 would be a commercially available bronze such as, for example, UNS C90500 (Bronze 62) or UNS C93200 (660 bronze) or a commercially available steel such as AISI 1018-1040. Substrates can be supplied as bars, tubings, castings, forgings, powdered metal or otherwise. The substrate hardness is typically 1000 to 1450 $HK_{25}$; however, it will vary significantly depending upon the material selected. In most applications, cost and availability will be the principal driver in selecting a substrate material.

Further referring to the exemplary embodiment of FIG. 2, the upper edge or circular rim of sleeve 26 contacts the lowermost lamination of the section of rotor 20 directly above, and the lower edge of sleeve 26 of rotor 20 directly below. Therefore, sleeve 26 supports the weight of the rotor sections 20 above and transmits any downward force on rotor sections 20 above to the next lower rotor section 20. A bearing body 28 has a hub or inner portion 30 that is located within the inner bore of each end ring 24, with a clearance between the end ring 24 inner diameter and the hub 30 outer diameter. Hub 30 is cylindrical and has less length than sleeve 26. In the most preferred embodiment, hub 30 is steel and may be magnetic.

A thrust washer 32 is located around the outer diameter of sleeve 26 and between the section of rotor 20 directly above and the upper edge of hub or inner portion 30. A similar thrust washer 32 is located between the lower edge of hub 30 and the rotor section 20 directly below. Thrust washers 32 are preferably of a non-metallic material, such as glass reinforced phenolic material. Alternatively, the thrust washer 32 may be made of a metallic material. The distance from the lower side of the lower thrust washer 32, to the upperside of the upper thrust washer 32 is about 1/32 inch less than the height of sleeve 26. This prevents the thrust washers 32 from supporting the weight of the rotor sections 20 located above. In an exemplary embodiment, the bearing body 28 may travel from about 1/16" to 1/4" and the thickness of the thrust washer 32 may range from about 1/32" to 1/8".

Further referring to the exemplary embodiment of FIG. 2, bearing body 28 has a flange or outer portion 34 that extends radially outward from hub 30. Outer portion 34 has a cylindrical periphery 36 that is spaced inward from the inner wall 16 of stator 14 by a clearance of about 0.003 to 0.005 inch on the diameter. The longitudinal thickness or height of the outer portion 34 is less than the distance between the two adjacent end rings 24. A plurality of passages 38 extend through the outer portion 34 for communicating oil contained within the housing 12. Bearing body 28 is normally of a hardened substrate material, such as, for example, nitralloy.

Further referring to the exemplary embodiment of FIG. 2, the cylindrical periphery 36 of the hearing body 28 outer portion 34 has an annular groove or cavity 40 extending circumferentially around bearing body 28 perpendicular to the axis of shaft 18. Cavity 40 is preferably rectangular in cross-section. An elastomeric element or ring 42 is received within cavity 40. Ring 42 is of an elastomeric material that will swell under prolonged contact with the type of oil that will be contained within the stator inner bore 16. In the most preferred embodiment, ring 42 is an ethylene-propylene rubber as described in U.S. Pat. No. 4,513,215, Apr. 23, 1985Del Serra.

Figure 3:
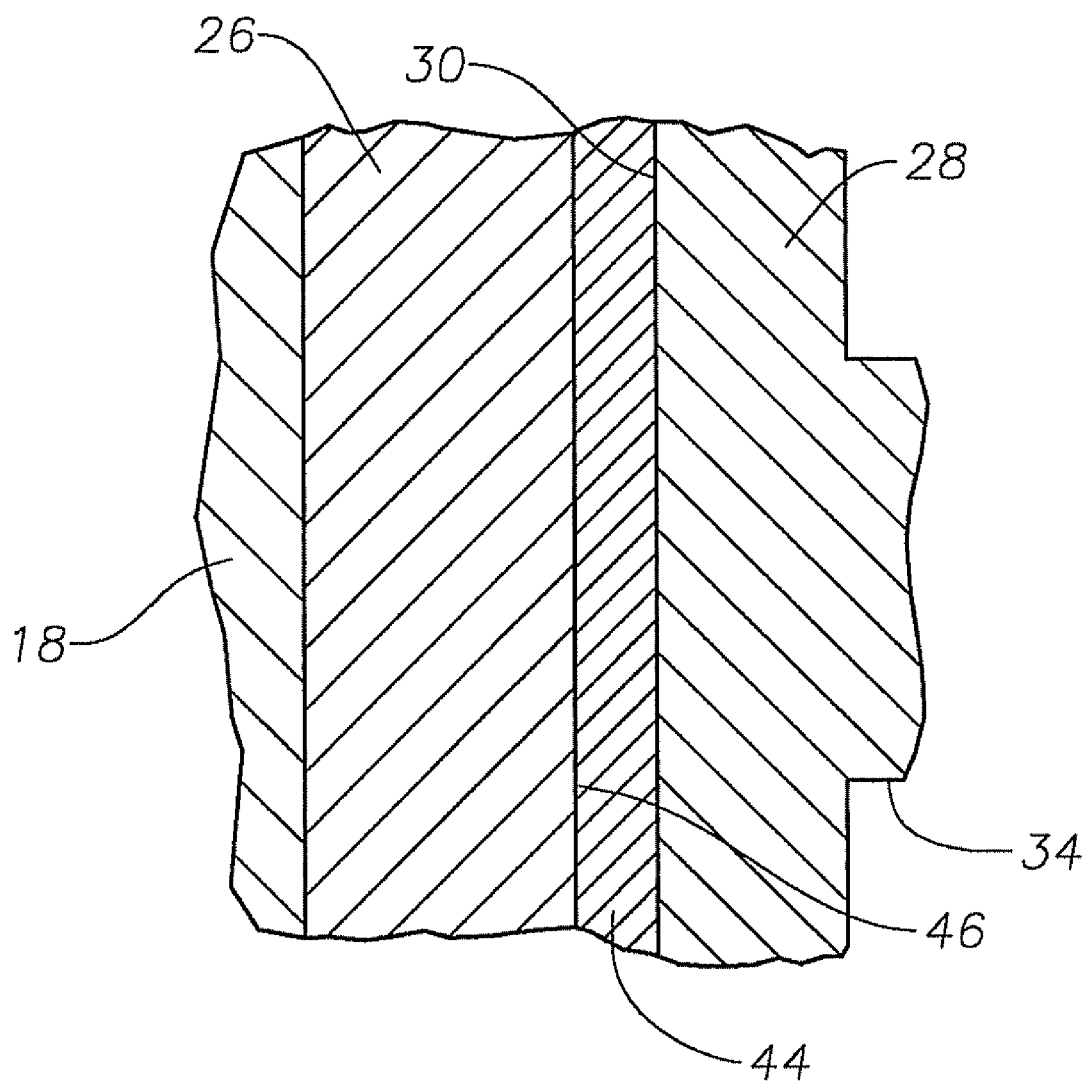
FIG. 3 is an enlarged sectional view of a nickel-boron layer according to an exemplary embodiment of the present invention.

Referring to FIG. 3, an exemplary embodiment of the present invention is schematically illustrated. The inner diameter of hub 30 of bearing body 28 is coated with a nickel-boron electroless deposition 44 in order to decrease motor wear and improve running life. However, in the alternative, all surfaces of bearing body 28 may be coated with coating 44. In the most preferred embodiment, the composition of coating 44 is 4.5%-7.0% boron by weight and balance to nickel, with less than 1.0% by weight impurities or other elements; however, other ratios may be utilized as desired. The thickness of coating 44 is exaggerated in FIG. 2. In the most preferred embodiment, nickel-boron coating 44 has a thickness of 0.00075 inches (±0.00025 inches). Other thicknesses, however, may be used if required to balance wear performance for particular applications. The nickel-boron coating can be applied using any variety of application techniques, such as, for example, those disclosed in U.S. Pat. Nos. 4,833,041 and 6,183,546.

Bearing body 28 may be machined after coating so that the finished dimensions will provide the desired clearances between various components in motor 10. However, in the most preferred embodiment, post-coating machining is not required because the substrate is machined prior to coating. Coating 44 is polished after it is applied, if desired, to achieve a desired surface finish of 8-16 RMS maximum. The outer diameter 46 of sleeve 26 is in sliding rotational engagement with coating 44. In an alterative embodiment, nickel-boron coating 44 may be applied to the outer surface 46 of sleeve 26 or the entire surface of sleeve 26, sized, machined and polished as previously discussed. Bearing assembly 28 and sleeve 26 can be constructed in accordance with embodiments of the present invention to be interchangeable with existing standard non-coated bearings and sleeves.

In an exemplary experimental embodiment, comparative testing was conducted to compare the amount of wear in the sleeve 26 and bearing 28 during the operation of the motor 10. In particular, as set forth below, a first motor 10a was fabricated that included the nickel boron coating 44 and a second motor 10b was fabricated that did not include the nickel boron coating:

| Motor | Sleeve 26 | Bearing 28 | Nickel-Boron Coating 44 |
|---|---|---|---|
| 10a | Fabricated from Bronze 660 | Fabricated from Centralloy 155, this alloy is commercially available from Unilift Enertech | Yes - the coating 44 was provided on the sleeve 26 |
| 10b | Fabricated from Bronze 660 | Fabricated from Centralloy 155, this alloy is commercially available from Unilift Enertech | No |

During the testing of both motors, 10a and 10b, both motors were operated for 24 hours at 150 degree F. with each motor provided with six liters of CL-4 lubricating oil for lubricating the motors. During the testing of both motors, 10a and 10b, abrasive sand was initially added to the lubricating oil in the amount of 150 mL, and then further abrasive sand added in 6 hour intervals in the amount of 50 mL. The abrasive sand was INCAST Olivine #LE170 foundry sand. The comparative results of the tests of the motors, 10a and 10b, was as follows:

| | Before all dimensions in inches) | | After (all dimensions in inches) | | Wear (all dimensions in inches) | |
|---|---|---|---|---|---|---|
| Motor | Sleeve 26 | Bearing 28 | Sleeve 26 | Bearing 28 | Sleeve 26 | Bearing 28 |
| 10a (with coating 44) | 1.684 | 1.6885 | 1.677 to 1.683 | 1.685 | 0.001 to 0.007 | 0.0 |

-continued

| | Before (all dimensions in inches) | | After (all dimensions in inches) | | Wear (all dimensions in inches) | |
|---|---|---|---|---|---|---|
| Motor | Sleeve 26 | Bearing 28 | Sleeve 26 | Bearing 28 | Sleeve 26 | Bearing 28 |
| 10b (without coating 44) | 1.684 | 1.6885 | 1.649 to 1.663 | 1.689 | 0.021 to 0.035 | 0.0005 |

As demonstrated by the exemplary comparative experimental results, operation of the motor 10a, that included the nickel boron coating 44 applied to the sleeve 26, in an abrasive environment, only produced wear on the sleeve ranging from 0.001 to 0.007 inches. On the other hand, operation of the motor 10b, that did not include the nickel boron coating 44, in an abrasive environment, produced wear on the sleeve ranging from 0.021 to 0.035 inches. This was an unexpected test result. Furthermore, this exemplary comparative test result demonstrated that the motor 10a would have a much longer bearing life than for the motor 10b. Finally, this exemplary test result demonstrated that the motor 10a will have a much longer operating life than the motor 10b.

The exemplary embodiments of the invention have significant advantages. The coating of the exemplary embodiments of the present invention provide a hardened surface which decreases wear between the shaft bushing and bearing and improves motor running life. It is to be understood that the invention is not limited to the exact details of construction, operation, exact materials, or embodiments shown and described, as modifications and equivalents will be apparent to one skilled in the art. For example, the nickel-boron layer can be applied to the sleeve and to the bearing body and/or the thickness of the layer can be varied to achieve the same results.

The invention claimed is:

1. A submersible pump motor, comprising:
a rotatable shaft;
a metallic sleeve coupled to the rotatable shaft for rotation therewith;
a rotor section coupled to the rotatable shaft for rotation therewith;
a housing for receiving the shaft, the sleeve and the rotor section, the housing being filled with a dielectric lubricant;
a stator section coupled to and positioned within the housing;
a metallic tubular bearing body immersed in the lubricant and having an inner cylindrical surface that mates with and receives an outer cylindrical surface of the sleeve, the bearing body coupled to and positioned for non rotation within the housing;
wherein at least one of the cylindrical surfaces of the sleeve and the bearing body comprises a coating comprised of a nickel-boron; and
wherein a thickness of the nickel-boron coating is about 0.00075 inches plus or minus 0.00025 inches.

2. The submersible pump motor of claim 1, wherein the sleeve is fabricated from materials selected from the group consisting of: 62 bronze, 660 bronze, and AISI 1018-1040 steel.

3. The submersible pump motor of claim 1, wherein the bearing body is fabricated from a nitralloy.

4. The submersible pump motor of claim 1, wherein the nickel-boron coating comprises a nickel-boron electroless deposition.

5. The submersible pump motor of claim 1, wherein the nickel-boron coating comprises, by weight percentage, 4.5% to 7.0% boron, and the balance nickel.

6. A submersible pump motor, comprising;
a rotatable shaft;
a metallic sleeve coupled to the rotatable shaft for rotation therewith;
a rotor section coupled to the rotatable shaft for rotation therewith;
a housing tor receiving the shaft, the sleeve and the rotor section, the housing being filled with a dielectric lubricant;
a stator section coupled to and positioned within housing;
a metallic tubular bearing body immersed in the lubricant and having an inner cylindrical surface that mates with and receives an outer cylindrical surface of the sleeve, the bearing body coupled to and positioned for non rotation within the housing;
wherein at least one of the cylindrical surfaces of the sleeve and the bearing body comprises a coating comprised of a nickel-boron; and
wherein the nickel-boron coating comprises a surface finish of 8 to 16 RMS maximum.

7. A bearing assembly for use in a submersible pump motor that comprises a shaft having a rotor section coupled thereto and a housing for receiving the shaft and having a stator section coupled thereto, the housing being filled with a dielectric lubricant, the assembly comprising:
a metallic, sleeve adapted to be coupled to the rotatable shaft for rotation therewith, the sleeve having an outer cylindrical surface;
a metallic tubular bearing body that has an inner cylindrical surface that mates with and receives the outer cylindrical surface of the sleeve, the bearing body being adapted to be coupled to and position within the housing for non rotation in the housing;
wherein the cylindrical surface of at least one of the sleeve and the hearing body comprises a coating comprised of a nickel-boron; and
wherein the nickel-boron coating comprises a surface finish of 8 to 16 RMS maximum.

8. The assembly of claim 7, wherein the sleeve is fabricated from materials selected from the group consisting of: 62 bronze, 660 bronze, and AISI 1018-1040 steel.

9. The assembly of claim 7, wherein the bearing body is fabricated from a nitralloy.

10. The assembly of claim 7, wherein the nickel-boron coating comprises a nickel-boron electroless deposition.

11. The assembly of claim 7, wherein the nickel-boron coating comprises, by weight percentage, 4.5% to 7.0% boron, and the balance nickel.

12. A bearing assembly for use in a submersible pump motor that comprises a shaft having a rotor section coupled thereto and a housing for receiving the shaft and having a stator section coupled thereto, the housing being filled with a dielectric lubricant, the assembly comprising:
a metallic sleeve adapted to be coupled to the rotatable shaft for rotation therewith, the sleeve having an outer cylindrical surface;
a metallic tubular bearing body that has an inner cylindrical surface that mates with and receives the outer cylindrical surface of the sleeve, the bearing body being adapted to be coupled to and positioned within the housing for non rotation in the housing;

wherein the cylindrical surface of at least one of the sleeve and the bearing body comprises a coating comprised of a nickel-boron; and wherein a thickness of the nickel-boron coating is about 0.00075 inches plus or minus 0.00025 inches.

13. A method of manufacturing a submersible pump motor that when assembled comprises a shaft having a rotor section and a sleeve coupled thereto for rotation therewith and having an outer cylindrical surface, a housing for receiving the shaft and the rotor section, a stator section mounted for non rotation in the housing, and a metallic bearing body having an inner cylindrical surface in sliding engagement with the outer cylindrical surface of the sleeve, the bearing body being coupled in nonrotating engagement with an inner diameter of the stator, the method comprising:

applying coating of a nickel-boron to at least one of the cylindrical surfaces of the sleeve and the bearing body;

assembling the sleeve, the bearing body and the rotor section on the shaft;

inserting the assembly of the shaft, the sleeve, the rotor section and the bearing body into the inner diameter of the stator and coupling the bearing body to the inner diameter of the stator for non rotation relative to the stator;

filling the housing with a dielectric lubricant; and wherein a thickness of the nickel-boron coating is about 0.00075 inches plus or minus 0.00025 inches.

14. The method of claim 13, wherein the sleeve is fabricated from materials selected from the group consisting of: 62 bronze, 660 bronze, and AISI 1018-1040 steel.

15. The method of claim 13, wherein the bearing body is fabricated from a nitralloy.

16. The method of claim 13, wherein the nickel-boron coating comprises a nickel-boron electroless deposition.

17. The method of claim 13, wherein the nickel-boron coating comprises, by weight percentage, 4.5% to 7.0% boron, and the balance nickel.

18. The method of claim 13, wherein the nickel-boron coating comprises a surface finish of 8 to 16 RMS maximum.

* * * * *